(12) United States Patent
Cleaver et al.

(10) Patent No.: US 11,283,863 B1
(45) Date of Patent: Mar. 22, 2022

(54) DATA CENTER MANAGEMENT USING DIGITAL TWINS

(71) Applicant: Kyndryl, Inc., New York, NY (US)

(72) Inventors: James David Cleaver, Grose Wold (AU); Michael James McGuire, Sydney (AU); Pramod Vadayadiyil Raveendran, Bengaluru (IN); Seema Nagar, Bangalore (IN); Thuy Luong, Kellyville (AU); Kuntal Dey, Rampurhat (IN)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 17/103,797

(22) Filed: Nov. 24, 2020

(51) Int. Cl.
| | |
|---|---|
| *H04L 67/1008* | (2022.01) |
| *G06N 20/00* | (2019.01) |
| *H04L 67/55* | (2022.01) |
| *H04L 41/16* | (2022.01) |
| *H04L 41/0806* | (2022.01) |
| *H04L 41/147* | (2022.01) |
| *G06F 9/48* | (2006.01) |

(52) U.S. Cl.
CPC ......... *H04L 67/1008* (2013.01); *G06N 20/00* (2019.01); *H04L 41/0806* (2013.01); *H04L 41/147* (2013.01); *H04L 41/16* (2013.01); *H04L 67/26* (2013.01); *G06F 9/4843* (2013.01)

(58) Field of Classification Search
None
See application file for complete search history.

(56) References Cited

U.S. PATENT DOCUMENTS

| | | | |
|---|---|---|---|
| 9,881,430 B1 | 1/2018 | Shah et al. | |
| 2016/0127204 A1* | 5/2016 | Ozaki | H04L 43/06 709/224 |
| 2016/0247129 A1* | 8/2016 | Song | G06Q 10/20 |
| 2017/0024240 A1* | 1/2017 | Black | G06F 3/0608 |
| 2017/0091791 A1* | 3/2017 | Srinivasan | H02J 3/381 |
| 2018/0137219 A1* | 5/2018 | Goldfarb | G06N 20/00 |
| 2019/0005200 A1 | 1/2019 | Zimmerman et al. | |
| 2019/0087544 A1 | 3/2019 | Peterson | |
| 2019/0235994 A1* | 8/2019 | Epperlein | G06F 11/3664 |
| 2019/0266295 A1 | 8/2019 | Masuda et al. | |
| 2019/0287079 A1 | 9/2019 | Shiraishi et al. | |
| 2019/0294975 A1* | 9/2019 | Sachs | G06N 3/0454 |

(Continued)

OTHER PUBLICATIONS

Leppard, Jon. "Does your data center need a digital twin?." Posted at <https://www.datacenterdynamics.com/en/opinions/does-your-data-center-need-digital-twin/>. Mar. 18, 2019 (Year: 2019).*

(Continued)

*Primary Examiner* — Scott B Christensen
(74) *Attorney, Agent, or Firm* — Yee & Associates, P.C.

(57) ABSTRACT

A method, apparatus, system, and computer program product for managing a network data processing system. Digital twins of physical devices in the network data processing system are run by a computer system. The digital twins process workloads and the digital twins communicate with each other. An impact on a number of parameters for a first set of the digital twins that a second set of the digital twins has on the first set of the digital twins is identified by the computer system. A set of actions is performed by the computer system based on the impact on the number of parameters.

18 Claims, 8 Drawing Sheets

(56) References Cited

U.S. PATENT DOCUMENTS

| | | | | |
|---|---|---|---|---|
| 2019/0354922 | A1* | 11/2019 | Berti | G06F 21/6209 |
| 2019/0372826 | A1* | 12/2019 | Sherr | H04L 45/64 |
| 2020/0125973 | A1* | 4/2020 | Townend | G06N 20/00 |
| 2020/0183717 | A1 | 6/2020 | Deutsch et al. | |
| 2020/0227178 | A1 | 7/2020 | Lombardi et al. | |
| 2020/0348662 | A1* | 11/2020 | Cella | G05B 23/024 |
| 2021/0109873 | A1* | 4/2021 | Lee | G11C 7/1048 |
| 2021/0110262 | A1* | 4/2021 | Schmitt | G05B 23/024 |

OTHER PUBLICATIONS

"The digital twin for today's data center," Data Center Dynamics, Aug. 9, 2019, accessed Aug. 18, 2020, https://www.datacenterdynamics.com/en/whitepapers/the-digital-twin-for-todays-data-center/.

"The Digital Twin for Today's Data Center," Future Facilities, accessed Aug. 18, 2020, https://www.futurefacilities.com/the-digital-twin-for-todays-data-center/.

Mell et al., "The NIST Definition of Cloud Computing," National Institute of Standards and Technology, U.S. Department of Commerce, NIST Special Publication 800-145, Sep. 2011, 7 pages.

Anonymous, "Data Center Infrastructure Health Monitoring Through a Digital Twin," IP.com, Prior Art Database Technical Disclosure, Jun. 2, 2020, 4 pages.

* cited by examiner

DATA CENTER MANAGEMENT USING DIGITAL TWINS

BACKGROUND

1. Field

The disclosure relates generally to an improved computer system and, more specifically, to a method, apparatus, computer system, and computer program product to manage a group of physical devices in a network data processing system.

2. Description of the Related Art

A data center is a group of server computers that are in communication with each other over a network. The group of server computers can be located in a building or in multiple buildings that house the server computers and other components that support the server computers. These other components can include, for example, racks, storage systems, power devices, cooling devices, communications equipment, and other systems or devices.

A data center can be used by users and organizations to store data. Data centers can also provide processing resources for various requests from users. For example, a client may run a database on servers in a data center. The users may also provide access to word processing, a spreadsheet, an email, and other applications through the data center. For example, the data center can provide a cloud computing environment to users.

A data center can contain thousands of server racks in which power usages of over 400 MWs can occur. This power usage can result in an undesired increase in temperature in the data center. Temperature increases can affect server performance, the server life, and maintenance needs. Environmental control systems are employed in data centers to provide airflow and cooling to maintain a desired temperature for running servers.

SUMMARY

According to one embodiment of the present invention, a method manages a network data processing system. Digital twins of physical devices in the network data processing system are run by a computer system. The digital twins process workloads and the digital twins communicate with each other. An impact on a number of parameters for a first set of the digital twins that a second set of the digital twins has on the first set of the digital twins is identified by the computer system. A set of actions is performed by the computer system based on the impact on the number of parameters.

According to another embodiment of the present invention, a network management system comprises a computer system and a hardware manager in the computer system. The hardware manager runs digital twins of physical devices in a network data processing system. The digital twins process workloads and the digital twins communicate with each other. The hardware manager identifies an impact on a number of parameters that a first set of the digital twins has on a second set of the digital twins. The hardware manager performs a set of actions based on the impact on the number of parameters.

According to yet another embodiment of the present invention, a computer program product manages a network data processing system. The computer program product comprises a computer-readable storage media with first program code, second program code, and third program code stored on the computer-readable storage media. The first program code is executable by a computer system to cause the computer system to run digital twins of physical devices in the network data processing system. The digital twins process workloads and the digital twins communicate with each other. The second program code is executable by the computer system to cause the computer system to identify an impact on a number of parameters that a first set of the digital twins has on a second set of the digital twins. The third program code is executable by the computer system to cause the computer system to perform a set of actions based on the impact on the number of parameters.

DETAILED DESCRIPTION

Figure 1:
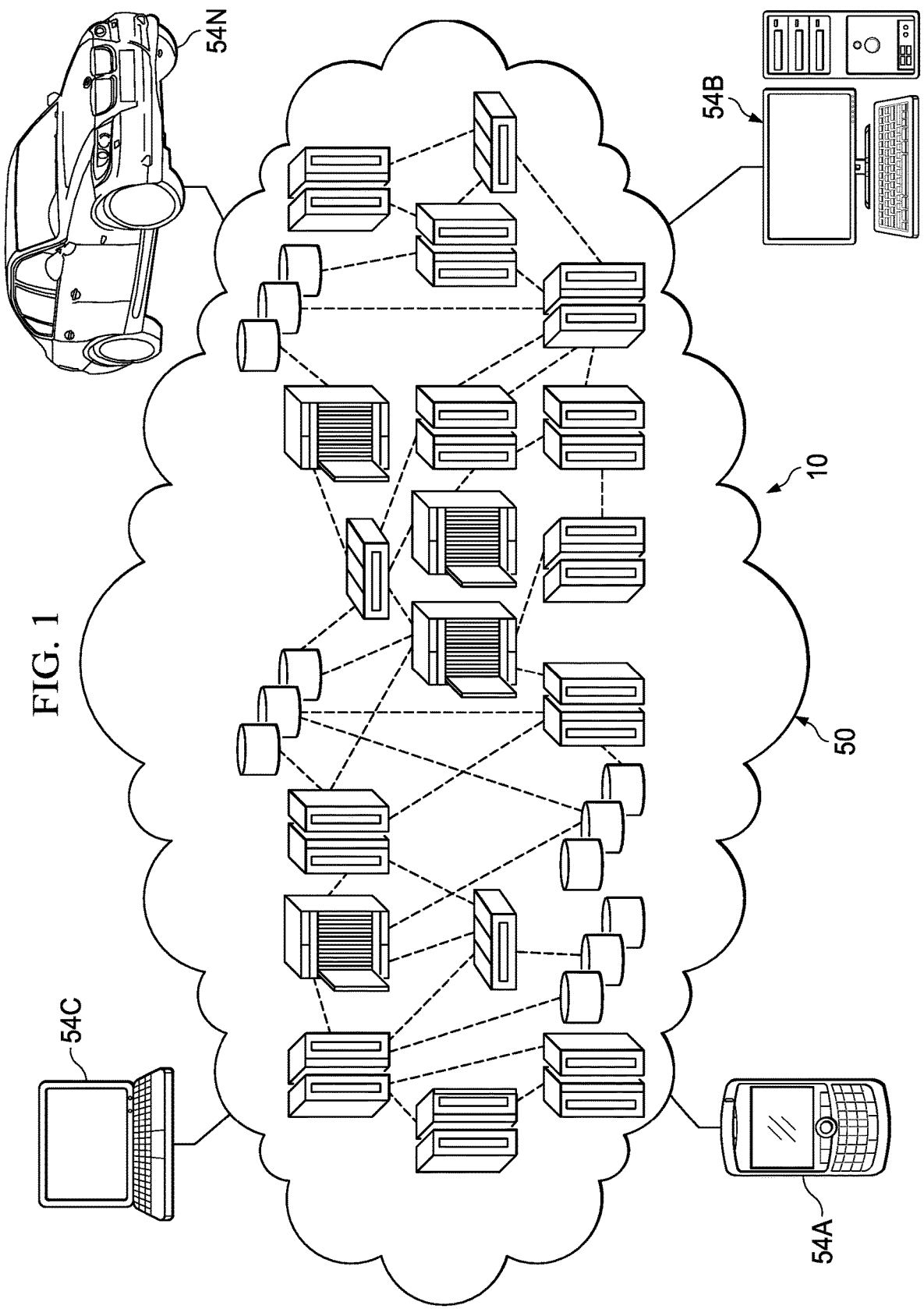
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may run entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may run the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which are run via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which run on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, run concurrently, substantially concurrently, in a partially or wholly temporally overlapping manner, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations. For example, the illustrative embodiments recognize and take into account that different locations in a data center may have higher amounts of heat generation as compared to other locations. The illustrative embodiments recognize and take into account that the location of workloads on servers can affect the amount of heat generated in a particular location in a data center. The illustrative embodiments recognize and take into account that hardware manufacturers are generally unaware of how their equipment impacts performance and behavior of the hardware devices supplied by the hardware manufacturers.

Therefore, it would be desirable to have a method and apparatus that take into account at least some of the issues discussed above, as well as other possible issues. For example, it would be desirable to have a method and apparatus that overcome a technical problem with determining an impact of the operation of physical devices on each other within a network such as server computers and other physical devices in a data center. For example, the illustrative embodiments recognize and take into account that it would be desirable to take into account the thermal effects of workloads running on different server computers in different locations in a data center. Further, the illustrative embodiments also recognize and take into account that workloads processed by server computers can have other impacts on processor use, memory use, or other parameters.

Thus, the illustrative embodiments provide a method, apparatus, system, and computer program product for managing a network. In one illustrative example, digital twins of physical devices in a network data processing system are run by a computer system. The digital twins process workloads and the digital twins communicate with each other. An impact on a number of parameters for a first set of the digital twins that a second set of the digital twins has on the first set of the digital twins is identified by the computer system. A set of actions is performed by the computer system based on the impact on the number of parameters.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, an illustration of cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that cloud computing nodes 10 in cloud computing environment 50 can communicate with any type of computerized device over any type of network and/or network addressable connection (e.g., using a web browser).

Figure 2:
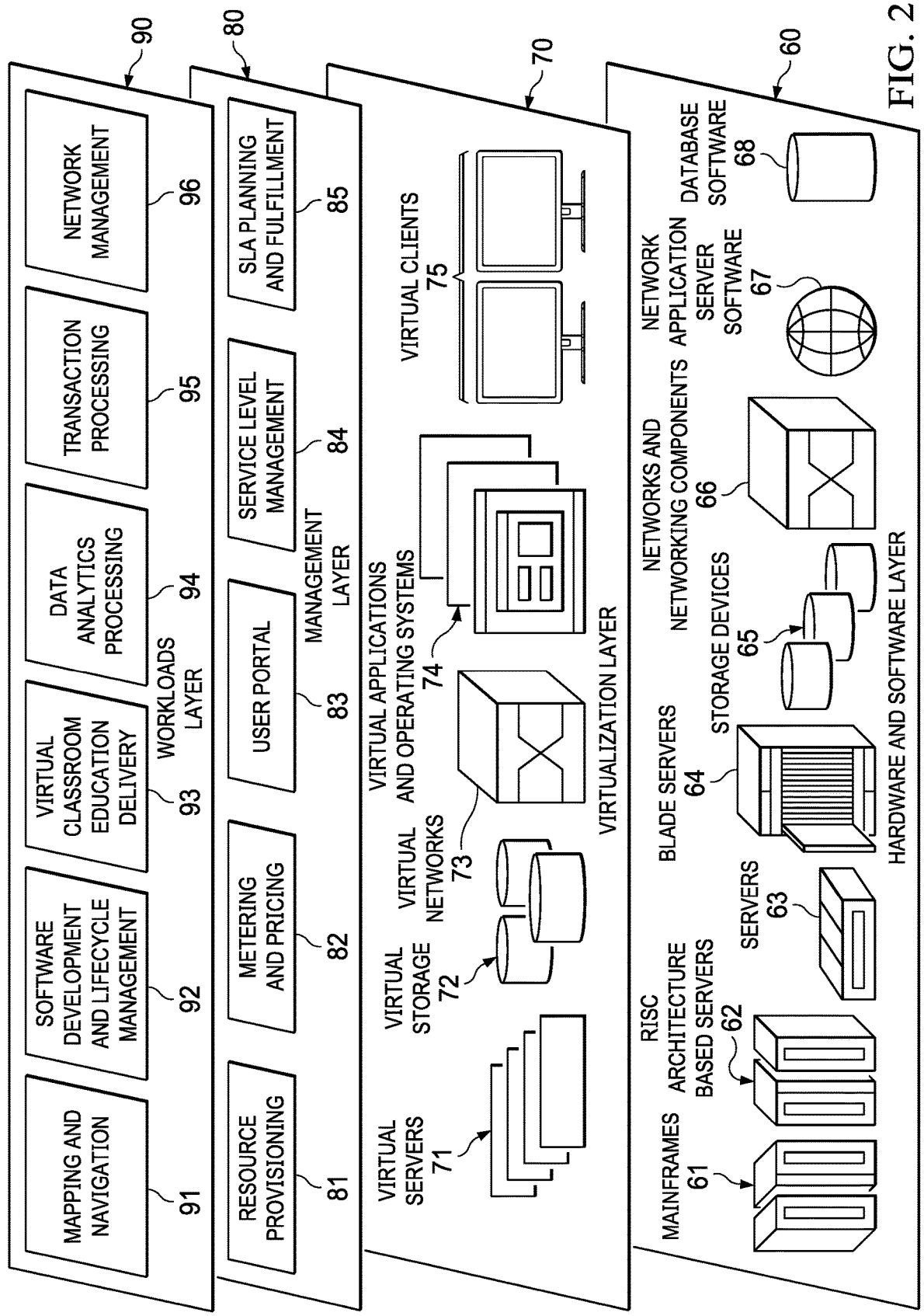
FIG. 2 is a set of functional abstraction layers provided by the cloud computing environment in FIG. 1 in accordance with an illustrative embodiment.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

As used herein, a "set of," when used with reference to items, means one or more items. For example, a "set of functional abstraction layers" is one or more functional abstraction layers.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and network management 96. Network management 96 provides a service for managing a network in cloud computing environment 50 in FIG. 1 or a network in a physical location that accesses cloud computing environment 50 in FIG. 1. In the illustrative example, this network can be, for example, one of a data center, a manufacturing facility, or some other type of location.

Figure 3:
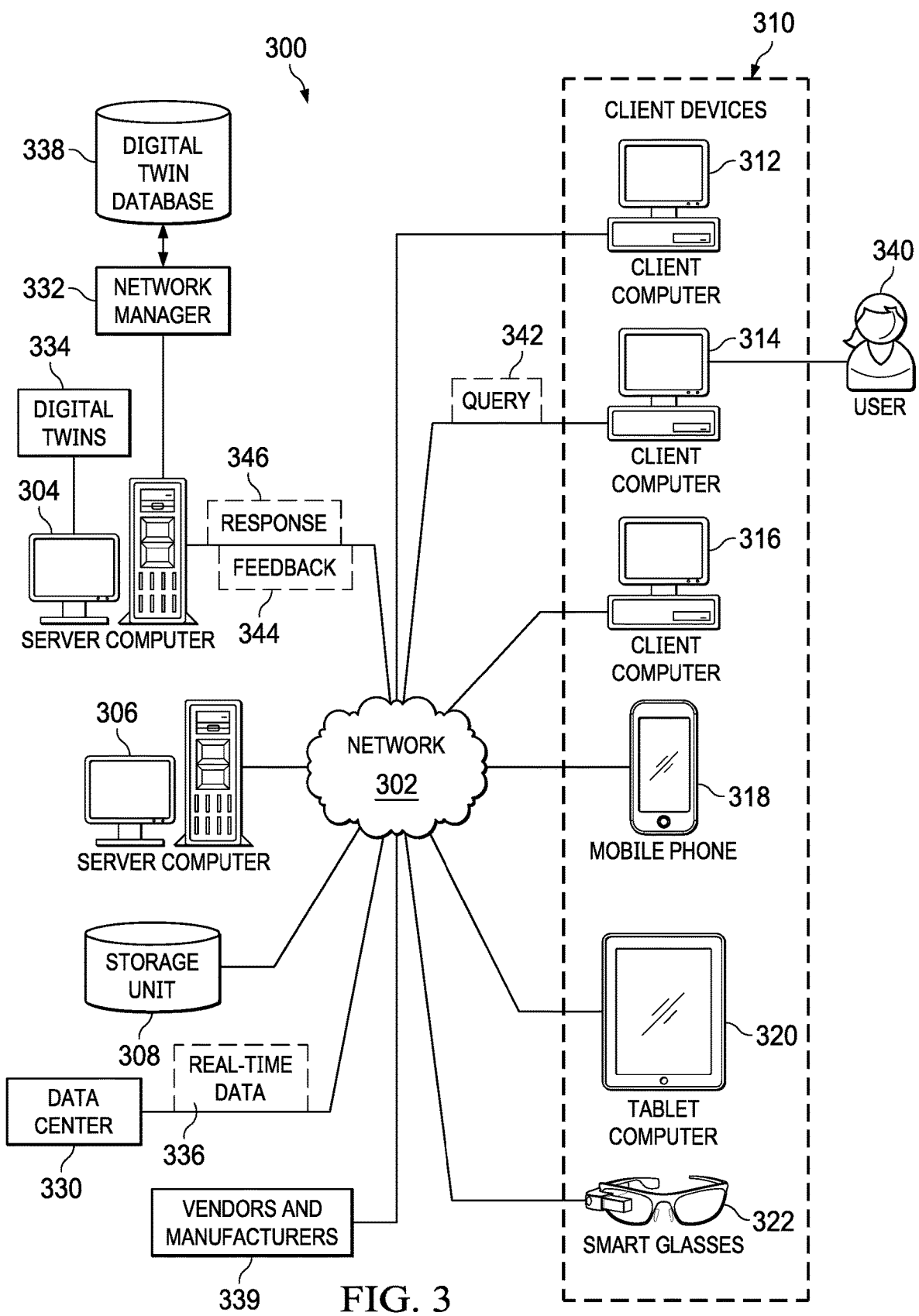
FIG. 3 is a pictorial representation of a network of data processing systems in which illustrative embodiments may be implemented.

With reference now to FIG. 3, a pictorial representation of a network of data processing systems is depicted in which illustrative embodiments may be implemented. Network data processing system 300 is a network of computers in which the illustrative embodiments may be implemented. Network data processing system 300 contains network 302, which is the medium used to provide communications links between various devices and computers connected together within network data processing system 300. Network 302 may include connections, such as wire, wireless communication links, or fiber optic cables.

In the depicted example, server computer 304 and server computer 306 connect to network 302 along with storage unit 308. In addition, client devices 310 connect to network 302. As depicted, client devices 310 include client computer 312, client computer 314, and client computer 316. Client devices 310 can be, for example, computers, workstations, or network computers. In the depicted example, server computer 304 provides information, such as boot files, operating system images, and applications to client devices 310. Further, client devices 310 can also include other types of client devices such as mobile phone 318, tablet computer 320, and smart glasses 322. In this illustrative example, server computer 304, server computer 306, storage unit 308, and client devices 310 are network devices that connect to network 302 in which network 302 is the communications media for these network devices. Some or all of client devices 310 may form an Internet-of-things (IoT) in which these physical devices can connect to network 302 and exchange information with each other over network 302.

Client devices 310 are clients to server computer 304 in this example. Network data processing system 300 may include additional server computers, client computers, and other devices not shown. Client devices 310 connect to network 302 utilizing at least one of wired, optical fiber, or wireless connections.

Program code located in network data processing system 300 can be stored on a computer-recordable storage media and downloaded to a data processing system or other device for use. For example, program code can be stored on a computer-recordable storage media on server computer 304 and downloaded to client devices 310 over network 302 for use on client devices 310.

In the depicted example, network data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 300 also may be implemented using a number of different types of networks. For example, network 302 can be comprised of at least one of the Internet, an intranet, a local area network (LAN), a metropolitan area network (MAN), or a wide area network (WAN). FIG. 3 is intended as an example, and not as an architectural limitation for the different illustrative embodiments.

As used herein, a "number of," when used with reference to items, means one or more items. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, data center 330 is connected to network 302. As depicted, data center 330 can provide at least one of storage or processing resources to client devices such as client devices 310. For example, data center 330 can provide storage for documents, images, spreadsheets, or other files generated by client devices 310. Further, data center 330 can provide processing resources such as word processing applications, spreadsheet applications, database applications, or other types of applications that client devices 310 can utilize.

In this illustrative example, data center 330 can be a physical data center. In other illustrative examples, data center 330 can be a virtual data center located in a cloud computing environment such as cloud computing environment 50 in FIG. 1 and the different components for this cloud computing environment in FIG. 2.

In this illustrative example, network manager 332 can operate to manage a network such as data center 330. In this illustrative example, network manager 332 can run digital twins 334 as part of managing data center 330. In this illustrative example, digital twins 334 are virtual representations of physical objects or systems in data center 330. Digital twins 334 are in communication with each other. In this manner, and exchange of information between digital twins 334 can be used to determine the impact of how the operation of one digital twin in digital twins 334 can impact other digital twins in digital twins 334. In addition, this communication also enables determining how the operation of the other digital twins can impact the digital twin in digital twins 334.

In this illustrative example, the communications can be provided through interfaces such as application programming interfaces (APIs) located in digital twins 334. As depicted, digital twins 334 are virtual representations of physical devices in which the software for digital twins 334 are in containers or microservices. In other illustrative examples, digital twins 334 can take other forms such as stand-alone servers, virtual machines, or other suitable implementations. In this depicted example, digital twins 334 run on server computer 304. In other illustrative examples, digital twins 334 can be run on other computers such as server computer 306, client computer 314, or some other suitable data processing system. Network manager 332 can run on the same or on a different computer from digital twins 334.

Further, digital twins 334 can also receive real-time data 336 from data center 330. In this illustrative example, real-time data 336 can be operational data relating to the operation of physical devices in data center 330. For example, real-time data 336 can include at least one of temperature, airflow information, workload processing, memory usage, processor usage, network traffic, or other information describing or affecting the operation of physical devices 412 in FIG. 4. This information can fluctuate based on the processing of workloads 414 in FIG. 4 by physical devices 412 as well as from other environmental factors. For example, scheduled maintenance, device failures, and other factors can affect real-time data 336.

Real-time data 336 can be obtained from sensors in data center 330. The sensors can be physical sensors integrated as part of, connected to, or located proximate to physical devices represented by digital twins 334. Real-time data 336 can also be generated by physical devices in data center 330.

Real-time data 336 can be sent from data center 330 to network manager 332 over network 102. In turn, network manager 332 can send or relay real-time data 336 to digital twins 334. In other illustrative examples, real-time data 336 can be sent directly from data center 330 to digital twins 334.

In this illustrative example, real-time data 336 is data that is sent as quickly as possible without any intentional delay. Real-time data 336 provides near real-time linkage between digital twins 334 and the physical objects or systems and data center 330. The linkage provided by real-time data 336 can provide real-time or near real-time simulation of physical objects or systems in data center 330 corresponding to digital twins 334.

In this illustrative example, digital twins 334 can be obtained from digital twin database 338. Digital twin database 338 contains digital twins that can be uploaded by vendors and manufacturers 339 of physical devices. Access to digital twin database 338 can be provided by a client through a portal in network manager 332.

In the illustrative example, network manager 332 can analyze usage patterns and incidents using real-time data 336. Further, network manager 332 can compare these usage patterns and incidents with historical information. Network manager 332 can also determine whether deviations from baselines for the operation of physical devices represented by digital twins 334 have occurred. These types of deviations can result in network manager 332 performing a number of different actions. These actions can include generating an alert, scheduling maintenance, reallocating workloads, shutting down physical devices, or other suitable actions.

Additionally, network manager 232 can also respond to queries. For example, user 340 at client computer 314 can send query 342 to network manager 332. Query 342 can take a number of different forms. For example, query 342 can include a request for information about at least one of a current of operation physical devices represented by digital twins 334, a hypothetical situation for data center 330, or other information. The information can include insights and answers to query 342 and be returned to user 340 at client computer 314 in response 346. With response 346, user 340 can make changes or adjustments to at least one of the configuration, operation, maintenance, or other adjustments to data center 330.

Further, based on analysis of the operation of digital twins 334, network manager 332 can send feedback 344 to vendors and manufacturers 339. Feedback 344 can be used to make updates or adjustments to at least one of physical devices or digital twins 334 representing the physical devices supplied by vendors and manufacturers 339. Updates to digital twins 334 can then be uploaded to digital twin database 338 by vendors and manufacturers 339.

In this manner, the use of digital twins 334 to represent physical devices and data center 330 can enable real-time or near real-time management of data center 330. In the illustrative examples, communications between digital twins 334 are enabled such that the impact of the operation of digital twins 334 on each other can be taken into account. For example, the impact of heat output of a first physical device represented in digital twins 334 can be determined with the first physical device that is near the air intake of a second physical device represented in digital twins 334. In this manner, as the first physical device performs more work, more heat is generated which directly impacts the second device. In other words, workloads in particular physical devices can result in undesired heat being generated in different locations in data center 330. The use of digital twins 334 enables determining when this type of undesired heat occurs or to predict when the undesired heat may occur in different locations in data center 330 by running simulations of the workloads on digital twins 334.

In another illustrative example, the impact can be on power supplied to digital twins 334 in a simulation that represents the impact on the power supplied to physical devices in data center 330 represented by digital twins 334. Increased use of the power can result in increasing power fluctuations depending on the load on a power supply. This type of impact on the digital twins can indicate power issues that may occur with physical devices in data center 330 corresponding to digital twins 334.

These types of impacts can be determined using digital twins 334 in these illustrative examples. The ability to determine the impacts on the operation of physical devices represented by digital twins 334 can enable taking actions that improve the performance, enable better management, and increase the life of the physical devices in data center 330. As a result, at least one of outage avoidance, reduced maintenance, increased efficiency and power usage, or other desirable effects may occur when using digital twins 334 to model the operation of devices in data center 330.

Figure 4:
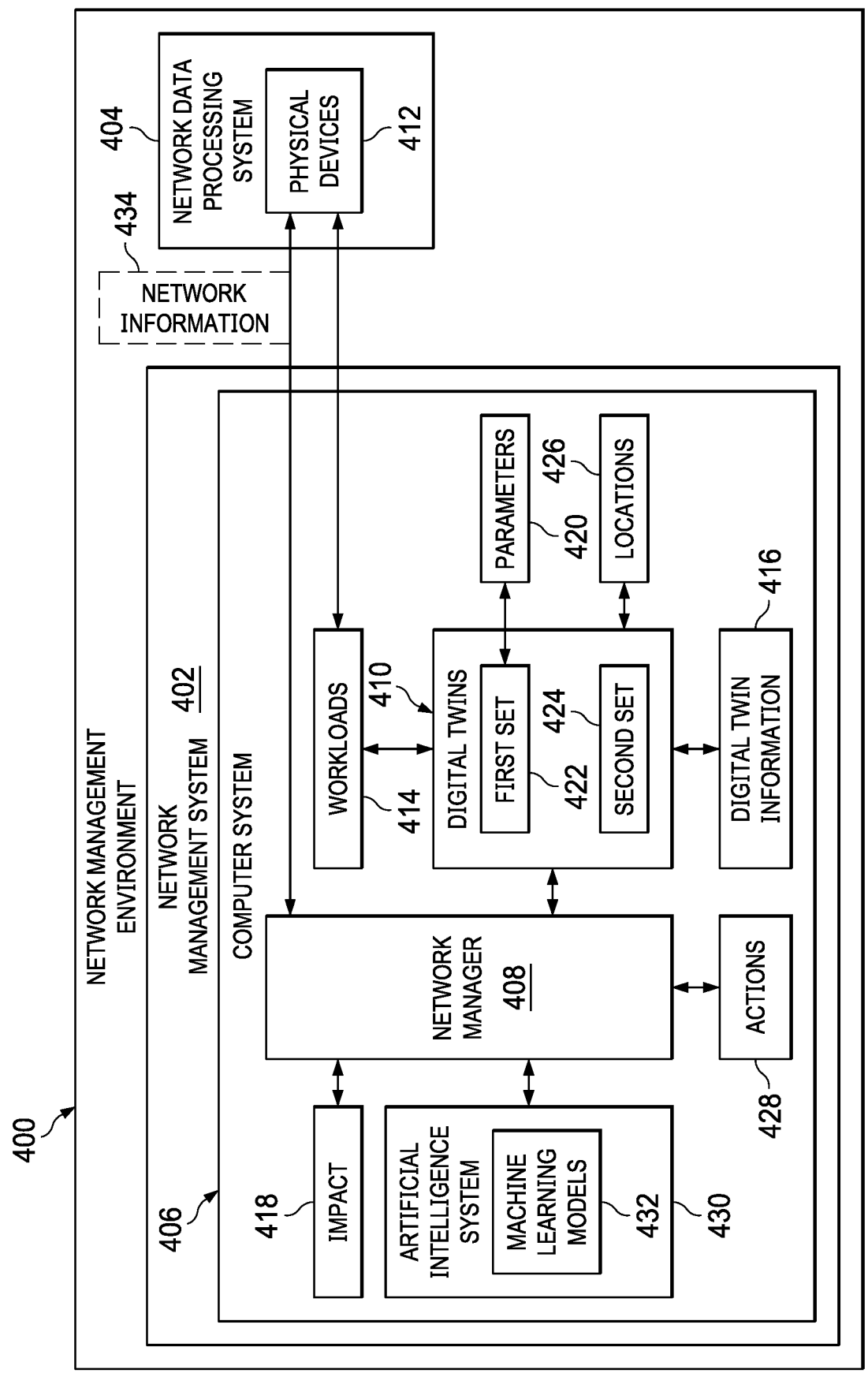
FIG. 4 is a block diagram of a network management environment in accordance with an illustrative embodiment.

With reference now to FIG. 4, a block diagram of a network management environment is depicted in accordance with an illustrative embodiment. In this illustrative example, network management environment 400 includes components that can be implemented in nodes 10 in cloud computing environment 50 in FIG. 1, physical devices in hardware and software layer 60 in FIG. 2, and physical devices shown in network data processing system 300 in FIG. 3.

In this illustrative example, network management system 402 operates to manage network data processing system 404. Network data processing system 404 comprises computers and a network. The network is the medium that provides communications links between various devices and computers connected together within network data processing system 404.

Network data processing system 404 can be used in a number of different locations. For example, network data processing system 404 can be located in at least one of a data center, a manufacturing facility, a design center, or some other location. The location of network data processing system 404 can be a single area or distributed in different areas. For example, when network data processing system 404 is a data center, the data center can be located in a single building or in multiple buildings.

As depicted, network management system 402 comprises computer system 406 and network manager 408. Network manager 408 is located in computer system 406. Network manager 408 can be implemented in software, hardware, firmware, or a combination thereof. When software is used, the operations performed by network manager 408 can be implemented in program code configured to run on hardware, such as a processor unit. When firmware is used, the operations performed by network manager 408 can be implemented in program code and data and stored in persistent memory to run on a processor unit. When hardware is employed, the hardware may include circuits that operate to perform the operations in network manager 408.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 406 is a physical hardware system and includes one or more data processing systems. When more than one data processing system is present in computer system 406, those data processing systems are in communication with each other using a communications medium. The communications medium can be a network. The data processing systems can be selected from at least one of a computer, a server computer, a tablet computer, or some other suitable data processing system.

In this illustrative example, network manager 408 can run digital twins 410 of physical devices 412 in network data processing system 404. Physical devices 412 can take a number of different forms. For example, physical devices 412 can be selected from at least one of a computer, a server computer, a storage system, an uninterruptable power supply, a power distribution unit, a cooling device, a rack, a switch, a router, a hub, a bridge, a wireless access point, a display device, or some other physical device.

Digital twins 410 comprise software that is a virtual representation of corresponding physical devices. In other words, digital twins 410 can emulate physical devices 412. Digital twins 410 can be models and can process workloads 414. In the illustrative example, workloads 414 can represent the same workloads processed by physical devices 412. In other illustrative examples, workloads 414 processed by digital twins 410 can be hypothetical workloads selected for a simulation. In some illustrative examples, digital twins 410 can take the form of machine learning models.

In the illustrative example, a digital twin in digital twins 410 can process workloads 414 in a number of different places. For example, the digital twin can actually process a workload as part of the virtual representation of the corresponding physical device. For example, processing a workload in workloads 414 can be performed using a "virtual workload" for the digital twin representing the physical device processing the workload in workloads 414.

In another illustrative example, the digital twin can process the workload in workloads 414 by processing the impact that the workload has on the physical device. For example, in processing the workload based on the impact of the workload, the digital twin can receive information such as sensor data and other application and workload metrics from different systems in network data processing system 404.

Additionally, digital twins 410 communicate with each other. In this illustrative example, digital twins 410 correspond to physical devices 412 in network data processing system 404. However, digital twins 410 may not correspond to all of physical devices 412 in this illustrative example. For example, digital twins 410 corresponding to physical devices 412 can correspond to a portion of physical devices 412 that is less than all of physical devices 412 in network data processing system 404. In other words, a digital twin may not be present for every physical device in network data processing system 404.

As depicted, a workload in workloads 414 can be the amount of work that a computer or set of computers is to perform. For example, the workload can be the total requests made by users and applications of a computer or a group of computers. The workload can also be measured with respect to the entire network data processing system. In the illustrative example, a workload running on a computer may not have a corresponding digital twin for a physical device in physical devices 412 in network data processing system 404.

In this illustrative example, digital twins 410 can communicate with each other using interfaces such as application programming interfaces (APIs). Digital twins 410 can communicate digital twin information 416 to each other. In this manner, digital twins 410 can work together in providing a virtual representation of physical devices 412 running in network data processing system 404.

By communicating digital twin information 416 to each other, a set of digital twins 410 can run in a manner that takes into account the operation of another set of digital twins 410. In this illustrative example, digital twin information 416 from a digital twin is information about the digital twin and the operation of the digital twin. Further, digital twin information 416 can also include simulation results.

Network manager 408 can identify impact 418 on a number of parameters 420 for first set 422 of digital twins 410 that second set 424 of digital twins 410 has on first set 422 of digital twins 410. In other words, the operation of one or more of digital twins 410 can have an effect on one or more of digital twins 410.

Impact 418 is the effect or change that can be caused to the number of parameters 420. In other words, impact 418 can cause values to change for parameters 420. In this illustrative example, the number of parameters 420 can be selected from at least one of a life, a performance, a response time, a channel capacity, a latency, a bandwidth, a processor resource use, a memory use, a power consumption, a temperature, an amount of heat generation, or some other parameter for first set 422 of digital twins 410.

For example, heat generation by a first digital twin can have an impact on the temperature of a second digital twin that is located adjacent to the first digital twin. In other illustrative examples, another parameter in parameters 420 that can be impacted is airflow. In this example, the heat generation is a virtual representation of heat for the simulation of heat generated by the corresponding physical device. In other illustrative examples, the heat generation by the first digital twin can be based on receiving sensor data identifying the heat generated by the physical device corresponding to the digital twin. In this illustrative example, the heat generation can be detected in sensor data sent in real-time.

Further, other parameters in parameters 420 can include, for example, a shock or vibration in an area or in a device in the area that has an impact on devices in the area. For example, a physical impact on a rack can have an impact on parameters for devices in the rack. As another example, an impact on a power data unit (PDU) in the rack can have an impact on all devices connected to the power data unit. As another example, humidity in the area may also have an impact on devices in the area or devices surrounding the area.

As a result, knowing locations 426 of digital twins 410 can enable taking into account the effect of a parameter such as heat generation by second set 424 of digital twins 410 on first set 422 of digital twins 410. Locations 426 can also be locations for corresponding physical devices to digital twins 410. In other words, the determination of the location of a physical device and associating that location with the corresponding digital twin can enable more accurate determinations of impact 418 on parameters 420.

As depicted, network manager 408 can perform a set of actions 428 based on impact 418 on the number of parameters 420. In this illustrative example, the set of actions 428 can be selected from at least one of scheduling maintenance, generating an alert, requesting a part replacement, scheduling a workload, generating a ticket, moving the workload from a first area that affects the set of parameters for an affected physical device in an undesired manner to a second area that does not affect the set of parameters for the affected physical device in the undesired manner, or some other suitable action.

For example, scheduling operations in network data processing system 404 can include setting a schedule for cooling devices such that cooling and power usage can be optimized for network data processing system 404. In this illustrative example, "optimized" means that the cooling and power usage can be improved, but is not necessarily the best cooling or power usage. This type of scheduling can be used to increase the life of various devices in network data processing system 404 by reducing or maintaining desired levels of temperatures.

In the illustrative example, network manager 408 can determine impact 418 on the number of parameters 420 based on processing of workloads 414 by digital twins 410 and locations 426 of digital twins 410. Locations 426 can be used to determine the impact of a parameter such as temperature.

In evaluating the current operation of network data processing system 404, workloads 414 being processed by digital twins 410 correspond to workloads 414 being processed by physical devices 412 corresponding to digital twins 410. Which workloads are being processed by which digital twins can be determined from network information 434.

In this illustrative example, at least one of identifying impact 418 or performing the set of actions 428 can be performed by network manager 408 using artificial intelligence system 430. As depicted, artificial intelligence system 430 is a system that has intelligent behavior and can be based on the function of a human brain. An artificial intelligence system comprises at least one of an artificial neural network, a cognitive system, a Bayesian network, a fuzzy logic, an expert system, a natural language system, or some other suitable system. Machine learning can be used to train artificial intelligence system 430. Machine learning involves inputting data into the process and allowing the process to adjust and improve the function of artificial intelligence system 430.

In this illustrative example, artificial intelligence system 430 includes a set of machine learning models 432. A machine learning model is a type of artificial intelligence model that can learn without being explicitly programmed. A machine learning model can learn based on training data input into the machine learning model. The machine learning model can learn using various types of machine learning algorithms. The machine learning algorithms include at least one of a supervised learning, an unsupervised learning, a feature learning, a sparse dictionary learning, an anomaly detection, association rules, or other types of learning algorithms. Examples of machine learning models 432 include an artificial neural network, a decision tree, a support vector machine, a Bayesian network, a genetic algorithm, and other types of models. These machine learning models can be trained using data and process additional data to provide a desired output.

As a result, network manager 408 can operate to run simulations on a daily or ad hoc basis with digital twins 410 using at least one of digital twin information 416 or network information 434. The results of the simulations can be analyzed by network manager 408 to determine impact 418 on a number of parameters 420 of one of more of digital twins 410. This analysis can be used perform a set of actions 428. The set of actions 428 can include sending information to manufacturers, vendors, or other parties. In this manner, updates to at least one of physical devices 412 for digital twins 410 can be performed.

Figure 5:
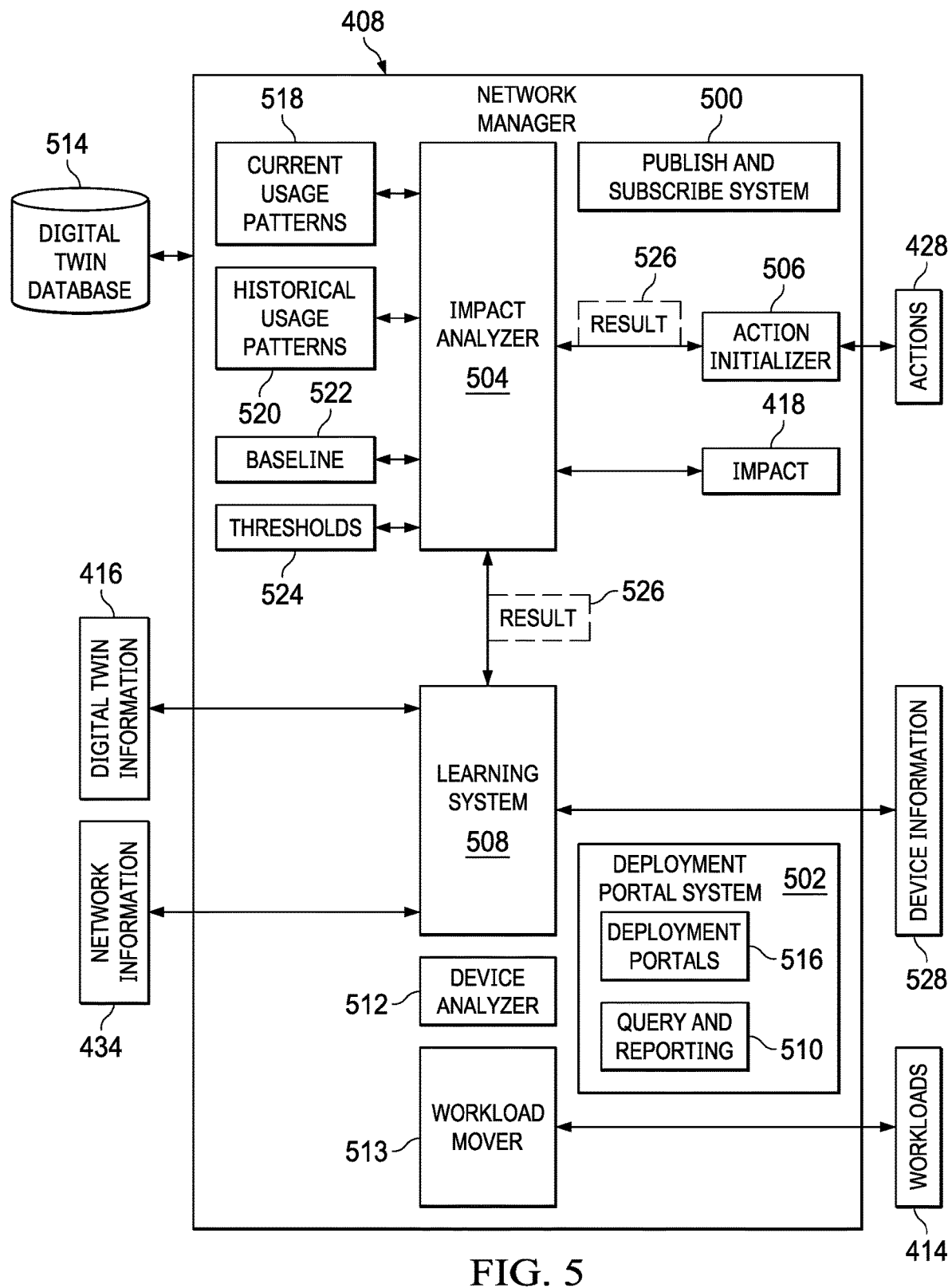
FIG. 5 is a block diagram of a network manager in accordance with an illustrative embodiment.

Turning now to FIG. 5, a block diagram of a network manager is depicted in accordance with an illustrative embodiment. In the illustrative examples, the same reference numeral may be used in more than one figure. This reuse of a reference numeral in different figures represents the same element in the different figures.

In this illustrative example, network manager 408 can include a number of different components. As depicted in this example, network manager 408 Includes publish and subscribe system 500, deployment portal system 502, impact analyzer 504, action initializer 506, learning system 508, query and reporting 510, device analyzer 512, and workload mover 513.

In this illustrative example, publish and subscribe system 500 enables manufacturers, vendors, or other parties to develop and store digital twins 410 in FIG. 4 in digital twin database 514. Publish and subscribe system 500 enables publishing digital twins 410 stored in digital twin database 514 by users or other parties who have a subscription. These subscriptions can be fee-based. As depicted, publish and subscribe system 500 can enable a user to at least one of update digital twins 410 or receive information about digital twins 410.

In this illustrative example, digital twins 410 represent physical devices 412 in FIG. 4. Digital twins 410 may be implemented in different forms. For example, digital twins 410 can be containers or micro services. In this example, a container is a packaging mechanism for deploying digital twins 410. For example, a container for a digital twin, such as a server computer, can include the application for processes emulating the server computer, application programming interfaces (APIs), libraries, and other files or information.

Deployment portal system 502 is used to deploy digital twins 410 for use in creating a virtual representation of an actual network data processing system. In this illustrative example, deployment portal system 502 comprises a set of deployment portals 516. A deployment portal in the set of deployment portals 516 can be customized or set up specifically for a particular user. Deployment portal system 502 can be set up in a hybrid multi-cloud setting such as in cloud computing environment 50 in FIG. 1.

In this illustrative example, a deployment portal can be employed by a user to download one or more of digital twins 410 for use in setting up a virtual representation of a virtual network data processing system such as a data center. In one illustrative example, ratings, reviews, and other information about the performance of digital twins 410 can be obtained through the deployment portal. Further, deployment portal system 502 can be used to access interfaces such as application programming interfaces (APIs) to connect digital twins 410 to each other.

Further, these interfaces can also be used to connect digital twins 410 to other sources of information that may be needed for simulating the operation of physical devices 412 in network data processing system 404 in FIG. 4. For example, the other sources of information can be, network information 434 in FIG. 4 from physical devices 412 in network data processing system 404.

In this illustrative example, deployment portal system 502 can be used to connect digital twins 410 to physical devices 412 to enable communications between digital twins 410 and physical devices 412 as well as identify physical relationships between digital twins 410. In this illustrative example, the communications are one way in which digital twins 410 receive network information 434 in FIG. 4 from at least one of physical devices 412 in FIG. 4 or other sources. In other illustrative examples, communications can be bidirectional. The physical relationships can be, for example, a location of digital twins 410 relative to each other based on locations 426 in FIG. 4 of physical devices 412 corresponding to digital twins 410.

In this manner, a user can select and configure digital twins 410 to represent both the logical and physical relationships of corresponding physical devices. With this type of setup, the impact of the operation of one digital twin on the operation of another digital twin can be determined in a manner that accurately represents the impact occurring on corresponding physical devices.

In this illustrative example, impact analyzer 504 can operate to analyze current usage patterns 518 to determine impact 418 on a number of parameters 420 in FIG. 4 for a first set of digital twins 410 that a second set of digital twins 410 may have on the first set of digital twins 410. Impact analyzer 504 can compare current usage patterns 518 to historical usage patterns 520. This analysis can be used to determine impact 418 on a number of parameters 420. This impact can be determined for one or more of digital twins 410.

In this illustrative example, usage patterns can include parameters 420 in FIG. 4. With current usage patterns 518, parameters 420 are the current or most recently obtained parameters. With historical usage patterns 520, parameters 420 are parameters identified for prior periods of time.

In this illustrative example, impact 418 can take the form of a score for each parameter or for the number of parameters 420 as a whole based on the variation of current usage patterns 518 from historical usage patterns 520. If the variation is great enough, the current usage pattern can be considered an abnormal usage pattern.

In this illustrative example, historical usage patterns 520 can be used to determine baseline 522 for each physical device. Deviations in current usage patterns 518 from baseline 522 for a digital twin can indicate an action may be needed with respect to the physical device corresponding to the digital twin.

In other words, baseline 522 can be a learned insight generated by the machine learning model or other process using historical usage patterns 520. In other illustrative examples, baseline 522 can be set by the manufacturer or vendor of the physical device.

In some illustrative examples, thresholds 524 may be identified from historical usage patterns 520. These thresholds can be used in analyzing current usage patterns 518 to determine whether actions are needed. A set of thresholds 524 can be identified for each digital twin. A threshold in the set of thresholds 524 can be identified automatically or set manually.

In this illustrative example, impact analyzer 504 can generate result 526. Result 526 can include an indication of whether a threshold has been exceeded. As another example, result 526 can include a score indicating the impact of each abnormal pattern identified in current usage patterns 518. As another example, result 526 can also include the analysis or comparison of current usage patterns 518 with historical usage patterns 520.

In this illustrative example, action initializer 506 can perform a set of actions 428 based on result 526 generated by impact analyzer 504. Action initializer 506 can perform a set of actions 428 using result 526. The set of actions 428 can take a number of different forms. For example, the set of actions 428 can be corrective actions or can be a reporting of information or a status of network data processing system 404 based on running digital twins 410. This information being reported can also include network information 434.

For example, the action can be based on an impact score or other information in result 526. The set of actions 428 can be selected from at least one of scheduling maintenance, generating an alert, requesting a part replacement, scheduling operations in network data processing system 404 in FIG. 4, scheduling a set of workloads 414, moving a workload from a first area that affects a set of parameters for an affected physical device in an undesired manner to a second area that does not affect the set of parameters for the affected physical device in the undesired manner, or some other suitable action. In this illustrative example, scheduling the set of workloads 414 can involve scheduling at least one of a location or time for each workload in the set of workloads 414 to be performed.

As depicted, learning system 508 gathers information from the environment including digital twins 410. This gathered information can be used to generate device information 528. In this illustrative example, device information 528 can include at least one of digital twin information 416 or network information 434. Additionally, device information 528 can also include information derived from impact 418 determined by impact analyzer 504.

Learning system 508 can be implemented using one or more machine learning models. Learning system 508 can send this information to publishers or digital twins 410 or other parties.

For example, learning system 508 can send information about at least one of digital twins 410 processing workloads 414 or impact 418 on the number of parameters 420 to manufacturers of physical devices 412 in FIG. 4 that digital twins 410 represent. In this manner, the manufacturers of digital twins 410 can make updates to at least one of digital twins 410 or physical devices 412. As another example, this information can be used in designing new physical devices. This information can be sent using a push or pull mechanism.

Query and reporting 510 can be implemented in deployment portal system 502. Query and reporting 510 can be used to obtain insights and answers to queries. For example, a user can use query and reporting 510 to obtain information about hypothetical situations that can include performing simulations for these hypothetical situations using digital twins 410. In the illustrative example, query and reporting 510 can receive a query for at least one of a hypothetical situation or information about a set of physical devices 412 in FIG. 4 running on the network data processing system 404 in FIG. 4.

Hypothetical situations can include, for example, determining impact 418 on a particular uninterruptible power supply (UPS) if additional server computers are added to network data processing system 404 in FIG. 4. Further, impact 418 can be on a number of parameters 420 comprising a life. In this case, impact 418 can be how the life of the uninterruptible power supply and other devices connected to the uninterruptible power supply can be affected. Additional parameters that can be impacted can include, for example, maintenance, network traffic, airflow, or other parameters.

Query and reporting 510 can employ machine learning models and simulation modules. In this manner, more information can be obtained about changes to situations that may result in refreshing or replacing devices that may not be performing well, reaching end-of-life, or forming potential threats to network data processing system 404 in FIG. 4.

In this illustrative example, device analyzer 512 can monitor impact 418 on parameters 420, such as, life and performance of physical devices 412 in FIG. 4 that are associated with digital twins 410. For example, the life and performance can include measuring impact 418 of workloads 414 being performed by physical devices 412. Workloads 414 being run on physical devices 412 in a selected location can have an undesired impact. For example, temperatures can rise higher than desired in a manner that affects at least one of the performance of those and potentially other physical devices. The performance can also include the life of physical devices as well as resource usage. As another example, the temperatures may not be effective in an undesired manner. However, cooling devices in physical devices 412 can run in a manner that reduces their life.

When device analyzer 512 determines that the change to performance exceeds a threshold, workload mover 513 can move workloads 414 from an affected location or device to another location or device within network data processing system 404 in FIG. 4 such that the impact to a particular physical device is reduced. Further, device analyzer 512 can continue monitoring changes to performance to determine when workloads 414 may be moved back to the location that was affected.

The different components in network manager 408 are shown as part of a single block. In other illustrative examples, these different components can be distributed on different computers in different locations. Further, in some illustrative examples, network manager 408 may include additional components or omit some of the depicted components in this example. For example, network manager 408 may not include query and reporting 510 in some illustrative examples.

Figure 6:
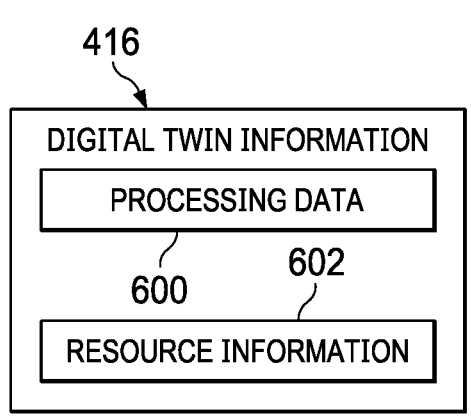
FIG. 6 is an illustration of digital twin information in accordance with an illustrative embodiment.

With reference to FIG. 6, an illustration of digital twin information is depicted in accordance with an illustrative embodiment. In this figure, examples of types of information of digital twin information 416 in FIGS. 4-5 are illustrated.

As depicted, digital twin information 416 includes a number of different types of data. In this example, digital twin information 416 comprises processing data 600 and resource information 602.

For example, processing data 600 in digital twin information 416 can include at least one of processor use, workload execution, workloads in a queue for processing, workload scheduling information, processor loads, temperature, memory use, power use, or other suitable information relating to the operation of a digital twin processing workloads.

In this illustrative example, resource information 602 identifies resources in a digital twin. Resource information 602 can include at least one of processor type or types, memory size, memory type, power supply unit characteristics, configuration information, or other information about resources in a digital twin.

Digital twin information 416 can be received by digital twins 410 in FIG. 4 through interfaces including at least one of a portal application programming interfaces (APIs), or other interfaces for connecting digital twins 410 to each other to enable digital twins 410 to receive digital twin information 416. These interfaces enable an exchange of digital twin information 416 between digital twins 410 such that the impact of the operation of one or more digital twins on another digital twin can be taken into account. For example, the exchange of digital twin information 416 enables determining the impact that digital twins 410 have on each other when processing workloads 414 in FIG. 4-5.

Figure 7:
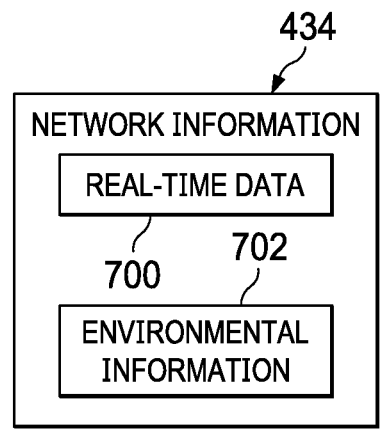
FIG. 7 is an illustration of network information in accordance with an illustrative embodiment.

Turning now to FIG. 7, an illustration of network information is depicted in accordance with an illustrative embodiment. In this figure, examples of types of information in network information 434 are illustrated. As depicted, network information 434 includes a number of different types of data. In this example, network information 434 comprises real-time data 700 and environmental information 702. Network information 434 can be used by at least one of network manager 408 or digital twins 410 to run digital twins 410 in FIG. 4.

In this illustrative example, real-time data 700 can be obtained from sensors in network data processing system 404 in FIGS. 4-5. The sensors can be attached to, located nearby, or integrated as part of physical devices 412 in FIG. 4 in network data processing system 404. Real-time data 700 can be used to determine what and how physical devices 412 are operating in network data processing system 404.

As depicted, real-time data 700 can be sent from sensors in a set of physical devices 412 to a set of digital twins 410 corresponding to the set of physical devices 412. In this illustrative example, real-time data 700 is sent as quickly as possible without intentional delay from the sensors to at least one of network manager 408 or digital twins 410. For example, temperature sensors can be located near, on, or within a server computer. These temperature sensors can send temperature information in real-time data 700 about the server computer. As another example, sensors can be used to detect airflow and temperature of the airflow within a data center, manufacturing floor, or other location of network data processing system 404 in FIG. 4. In yet another example, switches or routers can be used to detect traffic flowing through network data processing system 404.

Real-time data 700 can also be obtained directly from physical devices 412 in FIG. 4. For example, a physical device can send information about workloads and workload processing in real-time data 700. In other illustrative examples, a physical device can buy information about processor speeds, memory use, diagnostic information, or other information. In other illustrative examples, information about workloads can be obtained from real-time data 700 obtained from other sources in network data processing system 404. For example, real-time data about workloads can be obtained from a system management layer, a work management system, a monitoring and performance management system, or some other monitoring or performance logging tools that monitor physical devices in a manner that enables determining workloads being processed by those physical devices.

In this illustrative example, the use of real-time data 700 can be used to increase the accuracy in determining impact 418 in FIGS. 4-5 when running digital twins 410 in FIG. 4. As a result, a prediction of potential failures and asset criticality can be determined more accurately with this information.

Digital twins 410 of physical devices 412 in network data processing system 404 run using real-time data 700. For example, real-time data 700 can include information about workloads 414 in FIGS. 4-5. For example, real-time data 700 may identify locations 426 in FIG. 4 of workloads 414 being processed by digital twins 410. In this manner, a determination can be made as to whether digital twins 410 corresponding to physical devices 412 processing workloads 414 in locations 426 that are adjacent to each other or in a cluster such that a higher amount of heat generation occurs in contrast to digital twins 410 corresponding to physical devices 412 processing workloads 414 in locations 426 that are distributed or spread out from each other in network data processing system 404. In other words, as workloads 414 are more concentrated in locations 426 that are closer to each other, the amount of heat generated in those locations increases. In this manner, network manager 408 can determine where undesired concentrations of heat generation may occur from based on locations 426 of workloads 414.

As another example, real-time data 700 can include temperatures measured by sensors in network data processing system 404. These temperatures can be used by digital twins 410 to determine impact 418 on parameters 420. These temperatures can show how temperatures increase when workloads 414 are being performed in locations 426 that are clustered together as opposed to being spread out within network data processing system 404.

With the use of real-time data 700, a near real-time comprehensive linkage between physical and virtual devices can be enabled. This type of linkage can increase the insights in determining impacts occurring on physical devices 412. As a result, this information along with the interconnection of digital twins 410 can help provide optimized management of physical devices 412. This management may be used to increase the life of physical devices, reduce failures, avoid outages, schedule maintenance, or perform other actions that increase the performance of a network data processing system.

In this illustrative example, environmental information 702 can be used to determine information about the physical configuration of network data processing system 404 including configurations or locations 426 of physical devices 412. For example, locations 426 can include an identification of the rack in which a server computer is located and the slot in which the server computer is positioned in the rack. As another example, locations 426 can include information about the location of a cooling device. Further, the orientation of the cooling device can also be included in locations 426. This orientation can indicate a direction of airflow generated by the cooling device. In this manner, digital twins 410 can determine the effect that physical devices 412 have on each other when processing workloads 414.

In one illustrative example, environmental information 702 can include information received from at least one of an enterprise data lake, a multi-cloud services platform, ticketing tools, system/server/network/power/rack management tools, service management tools, orchestration and automation tools, authentication/authorization tools, historical data, IoT sensors, IoT management systems, edge services, a digital floor map identifying the position of each physical device including network connections, and environmental data identifying where physical devices operate. This information enables integrating digital twins 410 with entire information technology (IT) infrastructure of network data processing system 404 from end to end.

This environmental information can enable the interconnection of digital twins 410 within the specific environment for running simulations that can affect various physical devices within network data processing system 404 and determining impact 418 of connected physical devices. Further, this information enables digital twins 410 originating from multiple vendors to run in a manner that simulates the operation of corresponding physical devices more accurately. Network information 434 can be received by digital twins 410 through interfaces including at least one of portal application programming interfaces (APIs), or other interfaces for connecting to various external systems to digital twins 410 to enable digital twins 410 to receive information. In other illustrative examples, network information 434 may include real-time data 700 or environmental information 702, but not both types of information.

In one illustrative example, one or more solutions are present that overcome a problem with managing a network data processing system such as a data center. As a result, one or more solutions may provide an effect of enabling detecting situations in which actions should be performed to maintain or increase performance of a network data processing system. This performance can be at least one of increased processing capability, reduced power usage, reduced heat concentrations, increased life cycle for physical devices, reduced maintenance, or other types of performance.

Thus, network management system 402 can enable interconnection between digital twins 410 such that digital twins 410 can communicate with each other. This type of communication can enable determining when one digital twin impacts another digital twin based on at least one of workloads 414 for locations 426 of digital twins 410. Locations 426 of digital twins 410 correspond to the physical locations of corresponding physical devices in physical devices 412 to digital twins 410. In the illustrative examples, these locations can be a three-dimensional space. This type of location can take into account locations within a rack.

Further, locations 426 can also include the orientation of physical devices 412. For example, the orientation of a cooling unit can indicate the direction of airflow for use in determining temperature and heat effects in network data processing system 404. This type of simulation and analysis is in contrast to current techniques which only look at a single digital twin and do not take into account how the operation of one digital twin can affect another digital twin.

In this manner, a set of actions 428, such as corrective actions, can be taken to reduce undesired parameters such as heat. For example, workloads can be reallocated in a manner that reduces the generation of heat in a particular location.

Computer system 406 can be configured to perform at least one of the steps, operations, or actions described in the different illustrative examples using software, hardware, firmware, or a combination thereof. As a result, computer system 406 operates as a special purpose computer system in which network manager 408 in computer system 406 enables managing a network data processing system using digital twins that communicate with each other. In particular, network manager 408 transforms computer system 406 into a special purpose computer system as compared to currently available general computer systems that do not have network manager 408.

In the illustrative example, the use of network manager 408 in computer system 406 integrates processes into a practical application for a method to manage network data processing system 404 that increases the performance of network data processing system 404. Further, the performance of computer system 406 increases because of an ability to more accurately monitor the performance of network data processing system 404 using digital twins 410 that communicate with each other. In other words, network manager 408 in computer system 406 is directed to a practical application of processes integrated into network manager 408 in computer system 406 that runs digital twins 410 of physical devices in network data processing system 404 in which digital twins 410 process workloads and communicate with each other.

Additionally, impact 418 on a number of parameters 420 for first set 422 of digital twins 410 that second set 424 of digital twins 410 has on first set 422 of digital twins 410 can be identified. One or more actions 428 can be performed based on impact 418 on the number of parameters 420. In this illustrative example, network manager 408 in computer system 406 provides a practical application for managing network data processing system 404 such that the functioning of at least one of computer system 406 or network data processing system 404 is improved. For example, the performance of computer system 406 can be improved by enabling a more accurate impact of one digital twin on another digital twin.

Further, the illustrative examples provide a practical application for managing network data processing system 404 using digital twins 410 that communicate with each other and can also receive information from network data processing system 404. In this case, this information communicated between digital twins 410 can enable taking one or more actions 428 in a manner that improves the performance of network data processing system 404.

The illustration of network management environment 400 and the different components in FIGS. 4-7 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, artificial intelligence system 430 with a set of machine learning models 432 can be implemented as part of network manager 408 in some implementations. As another example, network manager 408 is shown as a single component. In some illustrative examples, functions for network manager 408 can be separated into separate components that can be run on the same or different computers in computer system 406. Further, multiple copies of network manager 408 can be present in which each network manager can manage a different network data processing system. In yet other illustrative examples, network manager 408 can manage one or more network data processing systems in addition to or in place of network data processing system 404.

In another illustrative example, digital twins 410 can also represent workloads 414 running on computers or other devices. In other words, digital twins 410 can also include a representation of a workload in addition to physical devices 412. In other words, when a workload in workloads 414 is running on multiple devices and physical devices 412, a digital twin in digital twins 410 can be present representing that workload.

Figure 8:
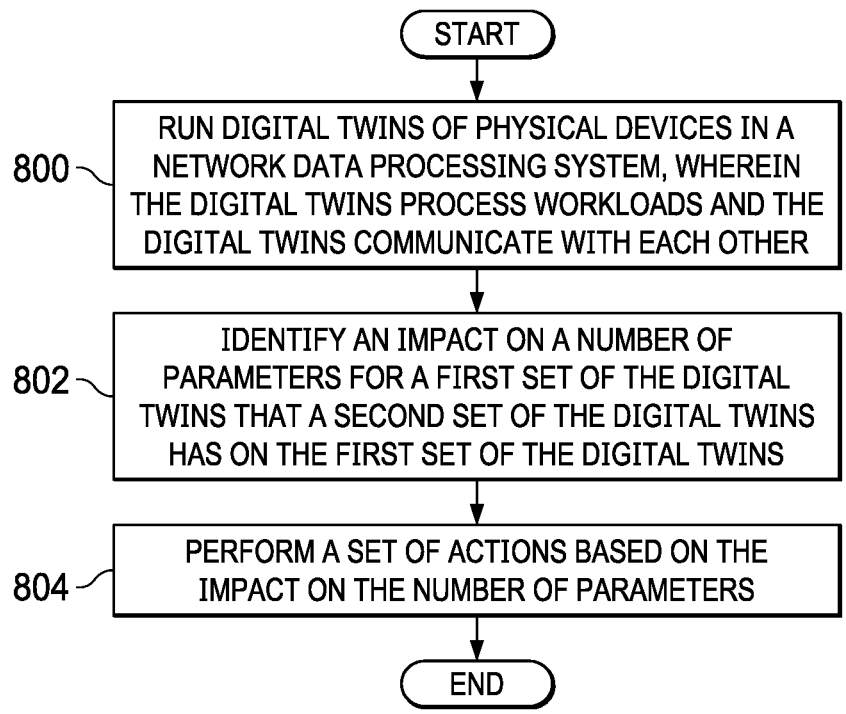
FIG. 8 is a flowchart of a process for managing a network data processing system in accordance with an illustrative embodiment.

Turning next to FIG. 8, a flowchart of a process for managing a network data processing system is depicted in accordance with an illustrative embodiment. The process in FIG. 8 can be implemented in hardware, software, or both. When implemented in software, the process can take the form of program code that is run by one or more processor units located in one or more hardware devices in one or more computer systems. For example, the process can be implemented in network manager 408 in computer system 406 in FIG. 4.

The process begins by running digital twins of physical devices in a network data processing system, wherein the digital twins process workloads and the digital twins communicate with each other (step 800). The process identifies an impact on a number of parameters for a first set of the digital twins that a second set of the digital twins has on the first set of the digital twins (step 802).

The process performs a set of actions based on the impact on the number of parameters (step 804). The process terminates thereafter.

Figure 9:
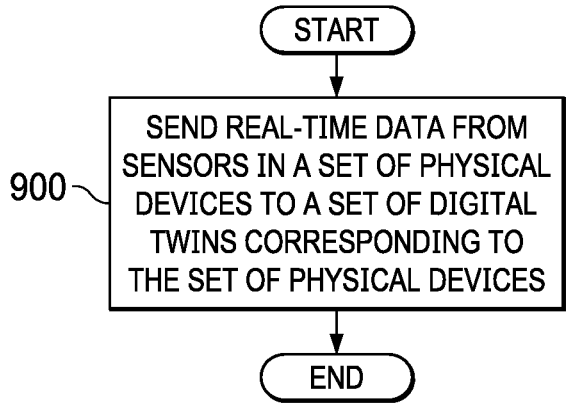
FIG. 9 is another flowchart of a process for managing a network data processing system in accordance with an illustrative embodiment.

With reference to FIG. 9, another flowchart of a process for managing a network data processing system is depicted in accordance with an illustrative embodiment. The process in FIG. 9 depicts an additional step that can be performed for the process illustrated in FIG. 8. This step can be run concurrently with other steps affected in FIG. 8

The process sends real-time data from sensors in a set of physical devices to a set of digital twins corresponding to the set of physical devices (step 900). The process terminates thereafter. With this step, running of the digital twins in step 800 in FIG. 8 can be performed by running the digital twins of physical devices in the network data processing system using the real-time data.

Figure 10:
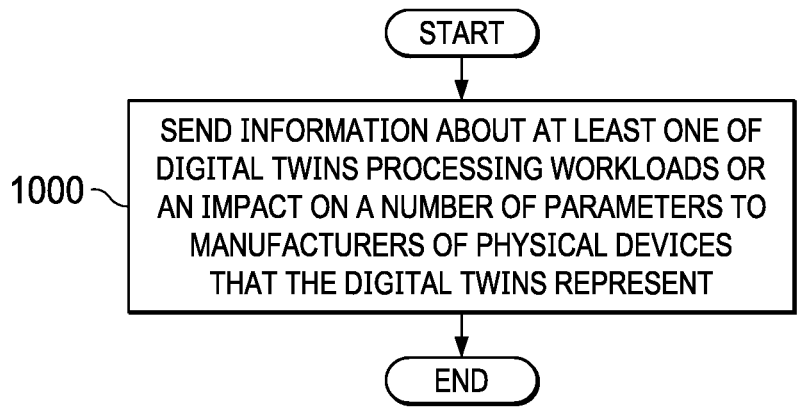
FIG. 10 is yet another flowchart of a process for managing a network data processing system in accordance with an illustrative embodiment.

Turning now to FIG. 10, yet another flowchart of a process for managing a network data processing system is depicted in accordance with an illustrative embodiment. The process in FIG. 10 depicts an additional step that can be performed for the process illustrated in FIG. 8. This step can be run concurrently with other steps affected in FIG. 8.

The process sends information about at least one of digital twins processing workloads or an impact on a number of parameters to manufacturers of physical devices that the digital twins represent (step 1000). The process terminates thereafter.

Figure 11:
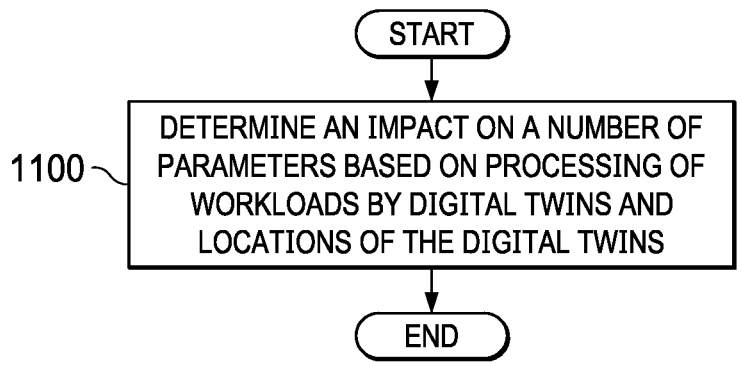
FIG. 11 is a flowchart of a process identifying an impact on a number of parameters in accordance with an illustrative embodiment.

In FIG. 11, a flowchart of a process identifying an impact on a number of parameters is depicted in accordance with an illustrative embodiment. The process in FIG. 11 is an example of an implementation for step 802 in FIG. 8.

The process determines an impact on a number of parameters based on processing of workloads by digital twins and locations of the digital twins (step 1100). The process terminates thereafter.

In step 1100, the locations of the digital twins processing the workloads can impact parameters such as temperature, power use, load on cooling devices, and other parameters that may be affected by the workloads being processed by the digital twins in close proximity to each other. In other words, as the workloads are processed by the digital twins that are closer to each other, the effect on these types of parameters can increase.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 12:
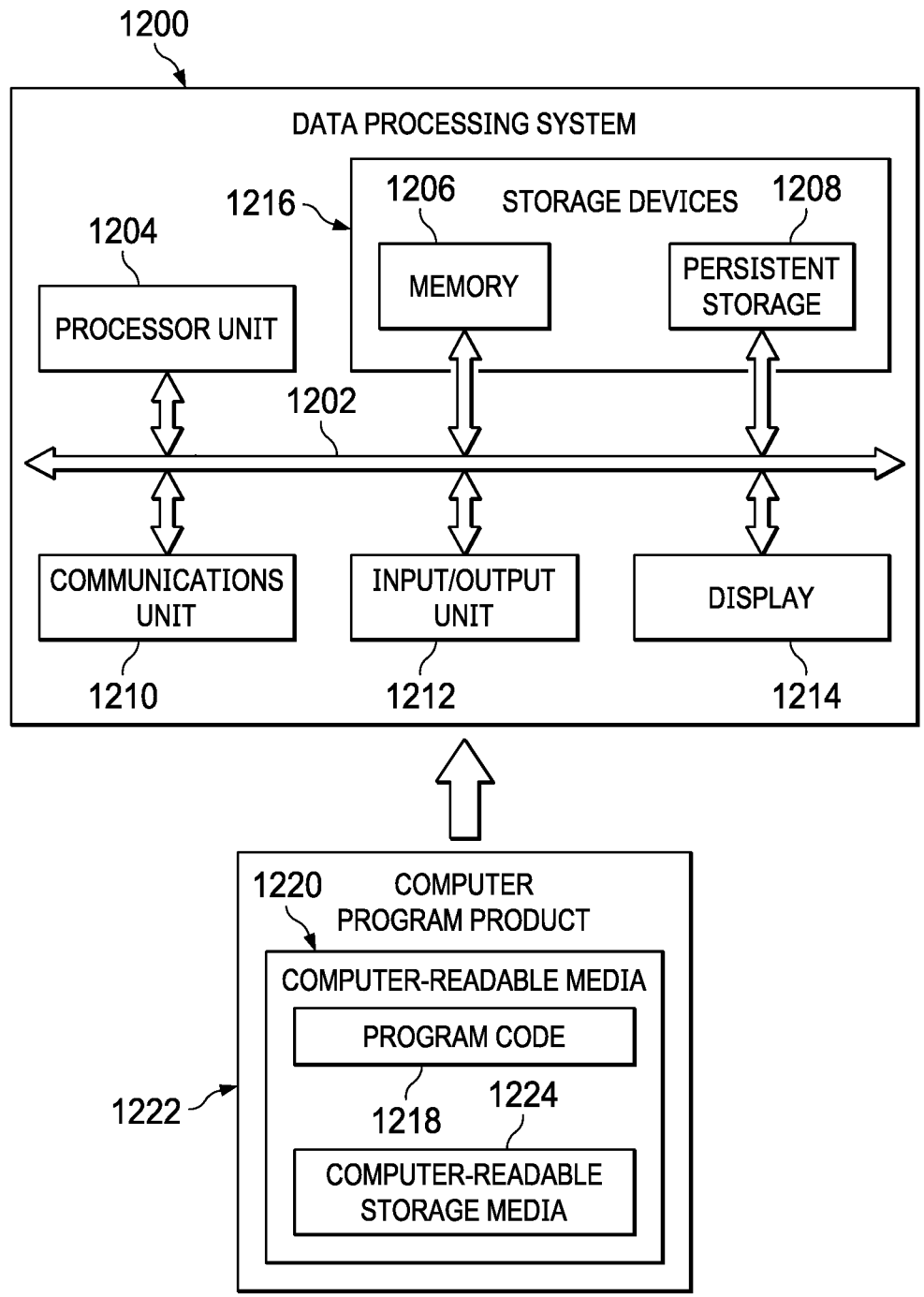
FIG. 12 is a block diagram of a data processing system in accordance with an illustrative embodiment.

Turning now to FIG. 12, a block diagram of a data processing system is depicted in accordance with an illustrative embodiment. Data processing system 1200 can be used to implement server computer 104, server computer 106, client devices 110, in FIG. 1. Data processing system 1200 can also be used to implement nodes 10 in FIG. 1, personal digital assistant (PDA) or cellular telephone 54A in FIG. 1, desktop computer 54B in FIG. 1, laptop computer 54C in FIG. 1, automobile computer system 54N in FIG. 1, hardware in hardware and software layer 60 in FIG. 2, and computer system 406 in FIG. 4. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 takes the form of a bus system.

Processor unit 1204 serves to process instructions for software that can be loaded into memory 1206. Processor unit 1204 includes one or more processors. For example, processor unit 1204 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1204 can may be implemented using one or more heterogeneous processor systems in which a main processor is present with secondary processors on a single chip. As another illustrative example, processor unit 1204 can be a symmetric multi-processor system containing multiple processors of the same type on a single chip.

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer-readable storage devices in these illustrative examples. Memory 1206, in these examples, can be, for example, a random-access memory or any other suitable volatile or non-volatile storage device. Persistent storage 1208 may take various forms, depending on the particular implementation.

For example, persistent storage 1208 may contain one or more components or devices. For example, persistent storage 1208 can be a hard drive, a solid-state drive (SSD), a flash memory, a rewritable optical disk, a rewritable magnetic tape, or some combination of the above. The media used by persistent storage 1208 also can be removable. For example, a removable hard drive can be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that can be connected to data processing system 1200. For example, input/output unit 1212 may provide a connection for user input through at least one of a keyboard, a mouse, or some other suitable input device. Further, input/output unit 1212 may send output to a printer. Display 1214 provides a mechanism to display information to a user.

Instructions for at least one of the operating system, applications, or programs can be located in storage devices 1216, which are in communication with processor unit 1204 through communications framework 1202. The processes of the different embodiments can be performed by processor unit 1204 using computer-implemented instructions, which may be located in a memory, such as memory 1206.

These instructions are referred to as program code, computer usable program code, or computer-readable program code that can be read and run by a processor in processor unit 1204. The program code in the different embodiments can be embodied on different physical or computer-readable storage media, such as memory 1206 or persistent storage 1208.

Program code 1218 is located in a functional form on computer-readable media 1220 that is selectively removable and can be loaded onto or transferred to data processing system 1200 for execution by processor unit 1204. Program code 1218 and computer-readable media 1220 form computer program product 1222 in these illustrative examples. In the illustrative example, computer-readable media 1220 is computer-readable storage media 1224.

In these illustrative examples, computer-readable storage media 1224 is a physical or tangible storage device used to store program code 1218 rather than a medium that propagates or transmits program code 1218.

Alternatively, program code 1218 can be transferred to data processing system 1200 using a computer-readable signal media. The computer-readable signal media can be, for example, a propagated data signal containing program code 1218. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1220" can be singular or plural. For example, program code 1218 can be located in computer-readable media 1220 in the form of a single storage device or system. In another example, program code 1218 can be located in computer-readable media 1220 that is distributed in multiple data processing systems. In other words, some instructions in program code 1218 can be located in one data processing system while other instructions in program code 1218 can be located in one data processing system. For example, a portion of program code 1218 can be located in computer-readable media 1220 in a server computer while another portion of program code 1218 can be located in computer-readable media 1220 located in a set of client computers.

The different components illustrated for data processing system 1200 are not meant to provide architectural limitations to the manner in which different embodiments can be implemented. In some illustrative examples, one or more of the components may be incorporated in or otherwise form a portion of, another component. For example, memory 1206, or portions thereof, may be incorporated in processor unit 1204 in some illustrative examples. The different illustrative embodiments can be implemented in a data processing system including components in addition to or in place of those illustrated for data processing system 1200. Other components shown in FIG. 12 can be varied from the illustrative examples shown. The different embodiments can be implemented using any hardware device or system capable of running program code 1218.

Thus, the illustrative embodiments provide a method, apparatus, system, and computer program product for managing a network. In one illustrative example, digital twins of physical devices in a network data processing system are run by a computer system. The digital twins process workloads and the digital twins communicate with each other. An impact on a number of parameters for a first set of the digital twins that a second set of the digital twins has on the first set of the digital twins is identified by the computer system. A set of actions is performed by the computer system based on the impact on the number of parameters.

With one or more illustrative examples, the impact on a number of parameters including environmental parameters can be determined based on continuous monitoring and providing the monitoring of those parameters as input to the digital twins. With the use of the digital twins, an identification of undesired impacts affecting physical devices corresponding to the digital twins can be identified. For example, undesired heat, pressure, vibrations, or other parameters within desired levels can be determined.

With the use of network information including at least one of real-time data or environmental information, a near real-time comprehensive linkage between physical and virtual devices can be enabled. This type of linkage can increase insights in determining impacts occurring on the physical devices. As a result, this information along with the interconnection of the digital twins can help provide better management of physical devices. This management may be used to increase the life of the physical devices, reduce failures, avoid outages, schedule maintenance, or perform other actions that increase the performance of a network data processing system, such as a data center.

In the illustrative example, the impact on performance from performing simulations and analyzing the results of the simulations using the digital twins can be used to readjust workloads that are assigned to different physical devices. In these illustrative examples, the digital twins communicate with each other and can also receive network information from the network data processing system. In this manner, the impact of the digital twins on each other can be analyzed in determining whether an action should be performed with respect to the network data processing system. With the use of a network management system with the digital twins in communication with each other, better information sharing can be enabled between different parties and downtime can be reduced.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for managing a network data processing system, comprising:
    sending real-time data from sensors in a first system in the network data processing system and a second system in the network data processing system to a plurality of digital twins, wherein:
        the first system comprises a first set of one or more physical devices and the second system comprises a second set of one or more physical devices independent of the first set of physical devices;
    running, by a computer system, the digital twins, the digital twins including at least a first set of digital twins of the first system and a second set of digital twins of the second system, wherein:
        the digital twins process workloads and the digital twins communicate with each other, and
        running, by the computer system, the digital twins of the physical devices in the network data processing system comprises running, by the computer system, the digital twins of the physical devices in the network data processing system using the real-time data;
    identifying, by the computer system, an impact on a number of parameters for the first set of the digital twins directly caused by the second set of the digital twins based on a comparison of baseline parameters of only the first set of digital twins with measured parameters of the first set of digital twins and the second set of digital twins, the impact representing an impact occurring on the first system caused by the second system; and
    performing, by the computer system, a set of actions with regard to the first system and/or the second system based on the impact on the number of parameters.

2. The method of claim 1 further comprising:
    sending information about at least one of the digital twins processing the workloads or the impact on the number of parameters to manufacturers of the physical devices that the digital twins represent.

3. The method of claim 1, wherein identifying, by the computer system, the impact on the number of parameters that the first set of the digital twins has on the second set of the digital twins comprises:
    determining the impact on the number of parameters based on processing of the workloads by the digital twins and locations of the digital twins.

4. The method of claim 1, wherein identifying, by the computer system, the impact on the number of parameters that the first set of the digital twins has on the second set of the digital twins comprises:
    identifying, by the computer system, the impact on the number of parameters that the first set of the digital twins has on the second set of the digital twins using a set of machine learning models.

5. The method of claim 1, wherein the impact on the number of parameters is selected from at least one of a life, a performance, a response time, a channel capacity, a latency, a bandwidth, a processor resource use, a memory use, a power consumption, a temperature, or an amount of heat generation.

6. The method of claim 1, wherein the set of actions is selected from at least one of scheduling maintenance, generating an alert, requesting a part replacement, scheduling operations in the network data processing system, scheduling a set of workloads, generating a ticket, or moving the workload from a first area that affects the number of parameters for an affected physical device in an undesired manner to a second area that does not affect the number of parameters for the affected physical device in the undesired manner.

7. A network management system comprising:
    a computer system; and
    a hardware manager in the computer system, wherein the hardware manager sends real-time data from sensors in a first system in the network management system and a second system in the network management system to a plurality of digital twins, wherein the first system comprises a first set of one or more physical devices and the second system comprises a second set of one or more physical devices independent of the first set of physical devices: runs the digital twins, the digital twins including at least a first set of digital twins of the first system and a second set of digital twins of the second system, wherein the digital twins process workloads and the digital twins communicate with each other; wherein runs the digital twins comprises runs the digital twins of the physical devices in the network management system using the real-time data; identifies an impact on a number of parameters for the first set of the digital twins directly caused by the second set of the digital twins based on a comparison of baseline parameters of only the first set of digital twins with measured parameters of the first set of digital twins and the second set of digital twins, the impact representing an impact occurring on the first system caused by the second system; and performs a set of actions with regard to the first system and/or the second system based on the impact on the number of parameters.

8. The network management system of claim 7, wherein the hardware manager sends information about at least one of the digital twins processing the workloads or the impact on the number of parameters to manufacturers of the physical devices that the digital twins represent.

9. The network management system of claim 7, wherein in identifying the impact on the number of parameters that the first set of the digital twins has on the second set of the digital twins, the hardware manager determines the impact on the number of parameters based on processing of the workloads by the digital twins and locations of the digital twins.

10. The network management system of claim 7, wherein in identifying the impact on the number of parameters that the first set of the digital twins has on the second set of the digital twins, the hardware manager identifies the impact on the number of parameters that the first set of the digital twins has on the second set of the digital twins using a set of machine learning models.

11. The network management system of claim 7 further comprising:
a publish and subscribe system that enables a user to at least one of update the digital twins or receive information about the digital twins.

12. The network management system of claim 7 further comprising:
a deployment portal system that provides an interface to connect the digital twins to each other such that the digital twins communicate with each other and with other physical devices in the network data processing system.

13. The network management system of claim 7, wherein the hardware manager receives a query for at least one of a hypothetical situation or information about a set of physical devices running in the network data processing system.

14. The network management system of claim 7, wherein the impact on the number of parameters is selected from at least one of a life, a performance, a response time, a channel capacity, a latency, a bandwidth, a processor resource use, a memory use, a power consumption, a temperature, or a heat generation.

15. The network management system of claim 7, wherein the set of actions is selected from at least one of scheduling maintenance, generating an alert, requesting a part replacement, scheduling operations in the network data processing system, scheduling the workloads, generating a ticket, or a moving a workload from a first area that affects the number of parameters for an affected physical device in an undesired manner to a second area that does not affect the number of parameters for the affected physical device in the undesired manner.

16. The network management system of claim 7, wherein the network data processing system is located in one of a data center, a manufacturing facility, and a design center.

17. The network management system of claim 7, wherein the physical devices are selected from at least one of a computer, a server computer, a storage system, an uninterruptable power supply, a power distribution unit, a cooling device, a rack, a switch, a router, a hub, a bridge, a wireless access point, or a display device.

18. A computer program product for managing a network data processing system, the computer program product comprising:
a computer-readable storage media;
first program code, stored on the computer-readable storage media, executable by a computer system to cause the computer system to send real-time data from sensors in a first system in the network data processing system and a second system in the network data processing system to a plurality of digital twins, wherein the first system comprises a first set of one or more physical devices and the second system comprises a second set of one or more physical devices independent of the first set of physical devices;
second program code, stored on the computer-readable storage media, executable by the computer system to cause the computer system to run the digital twins, the digital twins including at least a first set of digital twins of the first system and a second set of digital twins of the second system, wherein the digital twins process workloads and the digital twins communicate with each other, and wherein run the digital twins comprises running the digital twins of the physical devices in the network data processing system using the real-time data;
third program code, stored on the computer-readable storage media, executable by the computer system to cause the computer system to identify an impact on a number of parameters for the first set of the digital twins directly caused by the second set of the digital twins based on a comparison of baseline parameters of only the first set of digital twins with measured parameters of the first set of digital twins and the second set of digital twins, the impact representing an impact occurring on the first system and caused by the second system; and
fourth program code, stored on the computer-readable storage media, executable by the computer system to cause the computer system to perform a set of actions with regard to the first system and/or the second system based on the impact on the number of parameters.

\* \* \* \* \*